Patented Feb. 18, 1947

2,415,828

UNITED STATES PATENT OFFICE 2,415,828

PRINTING INKS

Ernest D. Lee, West Englewood, N. J., assignor to Interchemical Corporation, New York, N. Y., a corporation of Ohio No Drawing. Application June 25, 1946,
Serial No. 679,269

1 Claim. (Cl. 106—31)

This invention relates to printing inks which have the characteristic of being set by moisture, and is particularly intended to provide an inexpensive ink of this general character, characterized by good printing properties and excellent press-stability.

The setting of inks by the application of moisture as a precipitant, disclosed in the Gessler U. S. Patent No. 2,157,385, of May 9, 1939, has resulted in considerable research being undertaken to provide inks which give satisfactory printing at the higher humidities encountered in press rooms, combined with press stability, and rapid setting when exposed to moisture, whether in the liquid or vapor phase. Very few materials have been found which produce desirable inks. In general, the solvents have been restricted to the polyglycols and the polyether alcohols; the number of available resins is limited to a very few sharply defined classes, all of which are considerably more expensive than the resins commonly used in printing ink. Furthermore, all of the resins still leave something to be desired in the way of printability. As a result of these drawbacks, only a limited field of printing has been available to these moisture setting inks; they have not been able to compete in the large fields of publication and newsprinting, where low cost and good printing properties are essential elements.

In my copending application serial number 604,101, filed July 9, 1945, I disclosed that beta naphthol pitch made an excellent vehicle for inks of this general class, when dissolved in a water-soluble solvent of the class consisting of the polyglycols and the polyglycol mono-ethers.

I have now discovered that beta naphthol pitch, dissolved in propylene glycol, likewise makes an excellent vehicle for inks, which are characterized by their ability to or water-set, by their rapid drying with heat, and by their rapid setting by absorption into paper stocks.

Beta naphthol pitches are still-bottoms obtained in the production of beta naphthol, when the pure product is distilled from the crude naphthol, obtained by the fusion of naphthol sulfonic acid with alkali hydroxide, followed by separation of the crude from the reaction mixture. Until my discovery, they have had little technical utility, being burned as waste.

Typical examples of my invention are the following:

*Example 1.—Toned ink*

| | Parts by weight |
|---|---|
| Varnish consisting of 57% beta naphthol pitch and 43% propylene glycol | 60 |
| Water dispersible carbon black | 15 |
| Lamp black | 5 |
| Iron blue toner (36% iron blue, 64% varnish: 47% Amberol 750 (modified phenolic resin), 53% propylene glycol) | 6 |
| Methyl Violet toner: 20% methyl violet, 80% varnish (same as above) | 2 |
| Propylene glycol | 21 |
| | 110 |

This ink is a good dense black, which moisture sets, sets well by penetration into paper, and can be dried very rapidly with heat. It is stable up to about 65% relative humidity.

*Example 2.—Black ink*

| | Parts |
|---|---|
| Varnish of Example 1 | 65 |
| Carbon black | 20 |
| Propylene glycol | 15 | is a rather gray ink, which dries very nicely. It is stable up to about 65% relative humidity.

*Example 3*

If 3% of triethanolamine is added to the ink of Example 2, the ink is stable to above 80% relative humidity.

Obviously, examples can be multiplied indefinitely without departing from the scope of the invention which is defined in the claims. In particular, other pigments can be substituted for the black pigments used, although the pitch is so dark that no light color can be obtained. Inerts such as talc may be used to advantage. Small percentages of other resins may be used, provided they are soluble in propylene glycol.

The inks will tolerate some water, particularly when a stabilizing agent such as triethanolamine is incorporated into the ink. The typical printing ink addends, such as wax and dispersing agents, can also be incorporated.

I claim:

A printing ink characterized by its ability to be set by the application of water to a printed film which comprises pigment dispersed in a vehicle the major binder component of which is beta naphthol pitch dissolved in propylene glycol.

ERNEST D. LEE.

REFERENCES CITED

The following references are of record in the file of this patent:

UNITED STATES PATENTS

| Number | Name | Date |
| --- | --- | --- |
| 2,289,638 | Erickson | July 14, 1942 |

OTHER REFERENCES

Grempe, "Jour. Soc. Chem. Ind," 35, 463 (1916). (Copy in Science Library.)